(12) United States Patent
 Kang

(10) Patent No.: US 9,489,115 B2
(45) Date of Patent: Nov. 8, 2016

(54) METHOD, APPARATUS AND SYSTEM FOR DISPLAYED CONTENT TRANSFER BETWEEN SCREENS

(71) Applicant: Huawei Technologies Co., Ltd., Shenzhen, Guangdong (CN)

(72) Inventor: Zhi Kang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 370 days.

(21) Appl. No.: 14/097,450

(22) Filed: Dec. 5, 2013

(65) Prior Publication Data

US 2014/0089823 A1 Mar. 27, 2014

Related U.S. Application Data

(63) Continuation of application No. PCT/CN2012/085599, filed on Nov. 30, 2012.

(30) Foreign Application Priority Data

May 14, 2012 (CN) .......................... 2012 1 0148910

(51) Int. Cl.

| | |
|---|---|
| *G06F 3/00* | (2006.01) |
| *G06F 3/0484* | (2013.01) |
| *G06F 3/14* | (2006.01) |
| *G06F 3/0485* | (2013.01) |
| *G06F 3/0486* | (2013.01) |
| *G06F 3/0488* | (2013.01) |

(52) U.S. Cl.
CPC ......... *G06F 3/04847* (2013.01); *G06F 3/0485* (2013.01); *G06F 3/0486* (2013.01); *G06F 3/04883* (2013.01); *G06F 3/1446* (2013.01); *G09G 2300/026* (2013.01)

(58) Field of Classification Search
CPC ........... G06F 3/048847; G06F 3/0485; G06F 3/0486; G06F 3/04883; G06F 3/1446; G09G 2300/026
See application file for complete search history.

(56) References Cited

U.S. PATENT DOCUMENTS

| | | | |
|---|---|---|---|
| 6,018,340 A | 1/2000 | Butler et al. | |
| 8,416,346 B2 * | 4/2013 | Bae ........................ | G06F 3/0483 348/511 |
| 8,581,938 B2 | 11/2013 | Ikeda et al. | |

(Continued)

FOREIGN PATENT DOCUMENTS

| | | |
|---|---|---|
| CN | 1622619 A | 6/2005 |
| CN | 101227585 A | 7/2008 |

(Continued)

*Primary Examiner* — Anil N Kumar

(57) ABSTRACT

The present invention is applicable to the field of multi-screen display technologies. The method includes: detecting a sliding track of a user on the primary screen display device, where the sliding track includes a sliding direction, and an initial position and a real-time position of sliding; determining, according to the initial position and the real-time position of the sliding, a display area of a screen of the secondary screen display device after the sliding by using the sliding direction as a reference direction; tailoring currently displayed content of the primary screen display device according to the display area, to obtain tailored content; and sending the tailored content and the display area to the secondary screen display device, so that the secondary screen display device displays the tailored content on the display area.

8 Claims, 6 Drawing Sheets

(56) References Cited

U.S. PATENT DOCUMENTS

| | | |
|---|---|---|
| 2006/0116164 A1 | 6/2006 | Kang |
| 2009/0027302 A1* | 1/2009 | Li .................... G06F 3/1423 345/1.1 |
| 2010/0079672 A1 | 4/2010 | Bae et al. |
| 2010/0225664 A1 | 9/2010 | Ogasawara |
| 2013/0214995 A1* | 8/2013 | Lewin .................. G06F 3/1446 345/1.3 |
| 2013/0321340 A1* | 12/2013 | Seo .................... G06F 1/1641 345/174 |
| 2014/0168277 A1* | 6/2014 | Ashley ................. G06F 3/1446 345/672 |

FOREIGN PATENT DOCUMENTS

| | | |
|---|---|---|
| CN | 100420300 C | 9/2008 |
| CN | 101354639 A | 1/2009 |
| CN | 101714056 A | 5/2010 |
| CN | 101930333 A | 12/2010 |
| CN | 101996019 A | 3/2011 |
| CN | 102141858 A | 8/2011 |
| JP | 2011186488 A | 9/2011 |

* cited by examiner

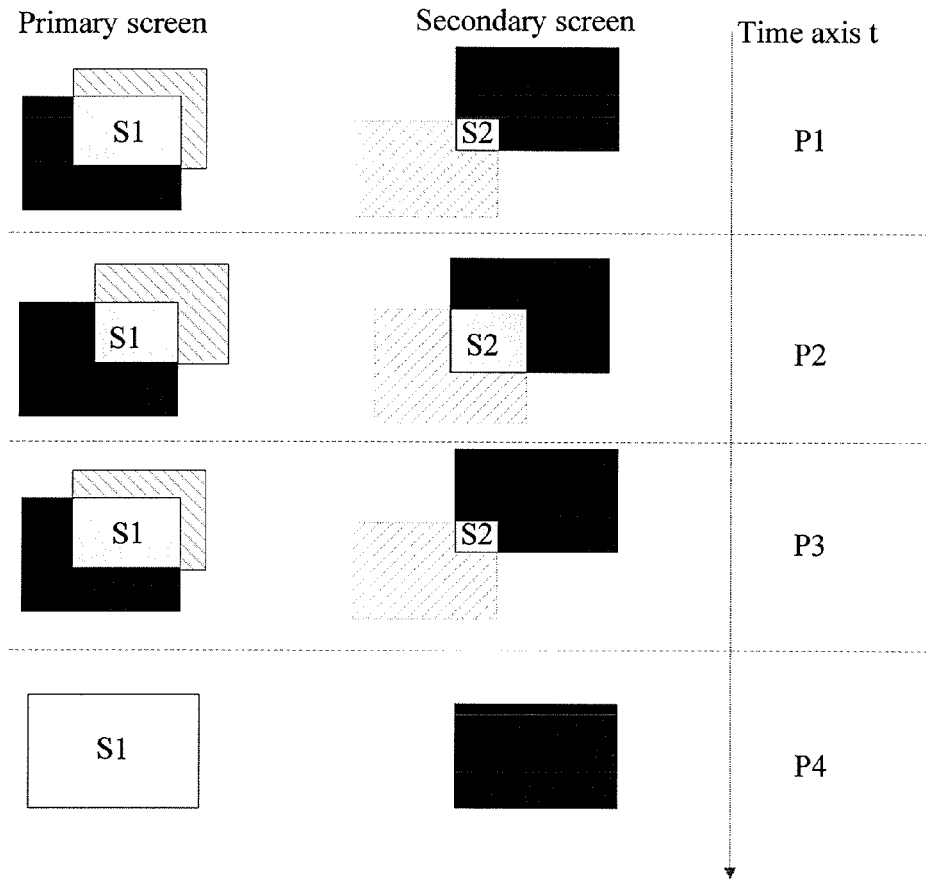

FIG. 5b

| Receive tailored content and a display area which are sent by the primary screen display device, where the display area is determined by the primary screen display device according to a sliding track of a user on the primary screen display device, and the tailored content is content obtained after the primary screen display device tailors currently displayed content of the primary screen display device according to the display area | S601 |

| Display the tailored content on the display area | S602 |

FIG. 6

METHOD, APPARATUS AND SYSTEM FOR DISPLAYED CONTENT TRANSFER BETWEEN SCREENS

CROSS-REFERENCE TO RELATED APPLICATIONS

This application is a continuation of International Application No. PCT/CN2012/085599, filed on Nov. 30, 2012, which claims priority to Chinese Patent Application No. 201210148910.5, filed on May 14, 2012, both of which are hereby incorporated by reference in their entireties.

TECHNICAL FIELD

The present invention belongs to the field of multi-screen display technologies, and in particular, to a method, an apparatus and a system for displayed content transfer between screens.

BACKGROUND

Displayed content transfer between screens refers to a process of displaying content, displayed on one screen, on another screen.

In the prior art, a sharing technology of displaying content on double screens exists, for example, the AirPlay product of Apple Inc. In this technology, after interconnection of display devices is implemented by using a universal plug and play (Universal Plug and Play, UpnP) protocol, content currently displayed in a PAD is displayed in another display device by touching a certain operation area of the PAD.

In the prior art, in the process of implementing transfer, content displayed in an initiating end (such as a PAD) is directly displayed on a destination end, and no dynamic transfer process exists, which affect user experience.

SUMMARY

An embodiment of the present invention provides a method for displayed content transfer between screens, so as to solve a problem in the prior art that dynamic transfer of displayed content cannot be embodied during transfer.

An embodiment of the present invention is implemented in the following manner. A method for displayed content transfer between screens, applied to a primary screen display device, is provided, where the primary screen display device is connected to a secondary screen display device. The method includes:

detecting a sliding track of a user on the primary screen display device, where the sliding track includes a sliding direction, and an initial position and a real-time position of sliding;

determining, according to the initial position and the real-time position of the sliding, a display area of a screen of the secondary screen display device after the sliding by using the sliding direction as a reference direction;

tailoring currently displayed content of the primary screen display device according to the display area, to obtain tailored content; and sending the tailored content and the display area to the secondary screen display device, so that the secondary screen display device displays the tailored content on the display area.

A method for displayed content transfer between screens, applied to a secondary screen display device, is provided, where the secondary screen display device is connected to a primary screen display device. The method includes:

receiving tailored content and information of a display area which are sent by the primary screen display device, where the display area is determined by the primary screen display device according to a sliding track of a user on the primary screen display device, and the tailored content is content obtained after the primary screen display device tailors currently displayed content of the primary screen display device according to the display area; and displaying the tailored content on the display area.

An embodiment of the present invention further provides an apparatus for displayed content transfer between screens, which is applied to a primary screen display device, where the primary screen display device is connected to a secondary screen display device. The apparatus includes:

a detecting unit, configured to detect a sliding track of a user on the primary screen display device, where the sliding track includes a sliding direction, and an initial position and a real-time position of sliding;

a display area determining unit, configured to determine, according to the initial position and the real-time position of the sliding, a display area of a screen of the secondary screen display device after the sliding by using the sliding direction as a reference direction;

a content tailoring unit, configured to tailor currently displayed content of the primary screen display device according to the display area, to obtain tailored content; and a content sending unit, configured to send the tailored content and the display area to the secondary screen display device, so that the secondary screen display device displays the tailored content on the display area.

An apparatus for displayed content transfer between screens, applied to a secondary screen display device, is provided, where the secondary screen display device is connected to a primary screen display device. The apparatus includes:

a receiving unit, configured to receive tailored content and a display area which are sent by the primary screen display device, where the display area is determined by the primary screen display device according to a sliding track of a user on the primary screen display device, and the tailored content is content obtained after the primary screen display device tailors currently displayed content of the primary screen display device according to the display area; and a display unit, configured to display the tailored content on the display area.

A system for displayed content transfer between screens includes an apparatus for displayed content transfer between screens which is applied to a primary screen display device and/or a secondary screen display device.

Compared with the prior art, the embodiments of the present invention have the following beneficial effects: In the embodiments of the present invention, when a sliding track of a user has been detected, a display area of a secondary screen is determined according to the sliding track, currently displayed content is tailored according to the determined display area of the secondary screen, and tailored content and the display area are sent to the secondary screen display device, so that the secondary screen display device displays the tailored content on the display area. Because the display area of the secondary screen is determined according to a real-time sliding track of the user, a process of dynamic transfer of the displayed content between screens may be fully embodied, thereby improving experience feeling of the user. The display is performed in real time but not performed after a sliding operation of the user stops, thereby avoiding a blank screen problem.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and persons of ordinary skill in the art may further obtain other drawings according to these accompanying drawings without creative efforts.

FIG. 5a and FIG. 5b are exemplary diagrams of a transfer process according to Embodiment 2 of the present invention;

FIG. 6 is an implementation flow chart of a method for displayed content transfer between screens according to Embodiment 3 of the present invention;

DETAILED DESCRIPTION

To make the objectives, technical solutions, and advantages of the present invention more comprehensible, the following further describes the present invention in detail with reference to the accompanying drawings and embodiments. It should be understood that, the specific embodiments described herein are merely used to explain the present invention, but not limit the present invention.

In order to describe the technical solutions of the present invention, the specific embodiments are used for description in the following.

Embodiment 1

Figure 1:
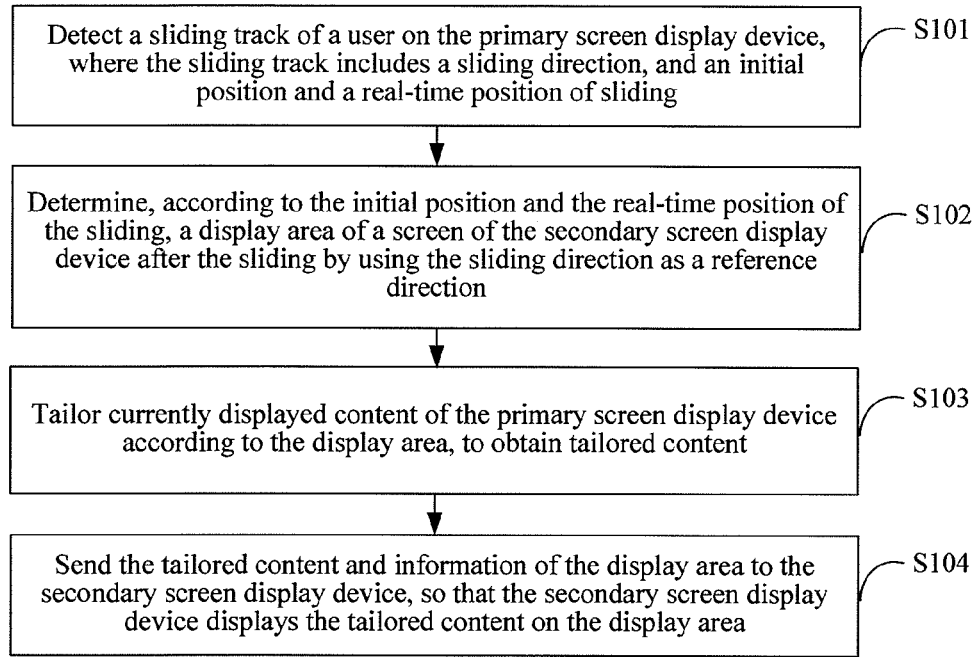
FIG. 1 is an implementation flow chart of a method for displayed content transfer between screens according to Embodiment 1 of the present invention.

FIG. 1 shows an implementation flow of a method for displayed content transfer between screens according to Embodiment 1 of the present invention, which is applied to a primary screen display device, where the primary screen display device is connected to a secondary screen display device, and a process of the method is described in detail in the following.

In step S101, detect a sliding track of a user on the primary screen display device.

In this embodiment, the sliding track includes a sliding direction, an initial position and a real-time position of sliding, and so on. The display device having the sliding track is a transfer initiating display device, and a screen of the transfer initiating display device is a primary screen.

It should be noted that, before detecting a sliding track of a user on the screen of the display device or on a touch pad connected to the display device, the method further includes interconnection of display devices and selection of a transfer destination display device.

Interconnection of display devices: The interconnection of display devices refers to establishing a communication connection between the transfer initiating display device and the transfer destination display device by using a UPnP protocol and based on a wireless or wired local area network. An interconnection process includes three stages: addressing, finding and description.

Addressing stage: A display device acquires an IP address through an automatic allocation policy of an IP address inside a local area network.

Finding stage: Determine, through the IP address, whether the display devices are visible to each other, so as to establish a network communication link.

Description stage: After a network connection succeeds, the transfer destination display device reports device information of the transfer destination display device, where the device information is shown in Table 1 (including, but not limited to, content described in Table 1).

TABLE 1

| Attribute | Description |
| --- | --- |
| Width | Width of an initial display frame of a display device |
| Height | Height of the initial display frame of the display device |
| xRes | Horizontal resolution |
| yRes | Vertical resolution |
| pixelFormat | Color model used during display of the display device |

Adaptation of different display capabilities is implemented for different display devices through the reported device information.

Selection of the transfer destination display device: When a pressing and holding (for example, for time longer than 2 seconds) instruction has been detected on a screen of a certain interconnected display device, it indicates that the display device is initiating a transfer operation. Then, currently interconnected display devices are scanned, and an interface of selecting a transfer destination display device is created, which is shown in Table 2.

TABLE 2

| Display Device ID | Display Device Name | Selection |
| --- | --- | --- |
| 2 | iPad 01 | |
| 3 | sharp aquos 8298U | |

A user selects, in the interface, one or more display devices as the transfer destination display device, and initiates a confirmation instruction to the transfer destination display device after completing the selection. A format of the instruction is as follows:

<SelectTarget  commandToken="98765"  clientId="1" targetId="2"/> where commandToken represents a unique token, used for verifying consistence between a request and a response;

clientId="1" represents an ID of the transfer initiating display device; and targetId represents an ID of the transfer destination display device selected by the user in the interface.

A conversation between the transfer initiating display device and the transfer destination display device is established according to targetId, and a display switching instruction is sent to the transfer destination display device. At the same time, data source initialization needs to be performed on the transfer destination display device, so as to ensure synchronization between frames of the transfer initiating display device and the transfer destination display device in a transfer process. A data source initialization process of the transfer destination display device is a video source resolution conversion process. Because display attributes of the transfer initiating display device and the transfer destination display device are not necessarily kept consistent, the resolution needs to be converted. During conversion, display data reported by each interconnected display device is taken as a conversion basis, and whether currently displayed content needs to be compressed or stretched is determined according to the reported display data. After the data source initialization is completed, the transfer initiating display device and the transfer destination display device enter a transfer control process simultaneously.

In the transfer control process, a sliding direction, an initial position and a real-time position of sliding of the user on the primary screen need to be detected.

Figure 2A:
FIG. 2a, FIG. 2b and FIG. 2c are exemplary diagrams of sliding directions according to Embodiment 1 of the present invention.
Figure 2B:
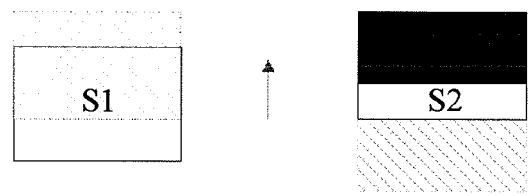
Figure 2C:
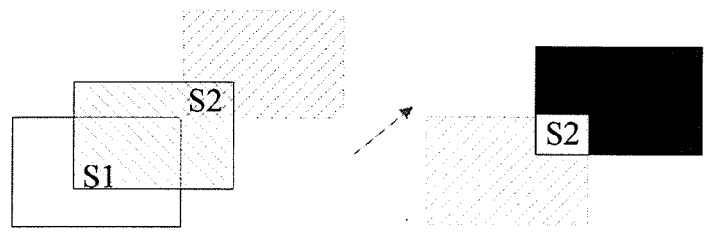

The sliding direction controls movement omnidirectionally within a 360 degree angle. As shown in FIG. 2, S1 is a display frame of the primary screen, and S2 is a display frame of a secondary screen. FIG. 2*a* is sliding in a horizontal direction, FIG. 2*b* is sliding in a vertical direction, and FIG. 2*c* is sliding in the 2 o'clock direction.

When the user performs sliding on the primary screen through touching, a touching and sliding event is captured and an initial position and a real-time position of the sliding are recorded, and the recorded initial position and real-time position are reported to an apparatus for displayed content transfer between screens.

The initial position is a position point firstly touched by the user on the primary screen when it is prepared to start transfer, and the real-time position is a position point touched by the user in real time on the primary screen in the transfer process. In order to ensure smooth transition of the displayed content and coherence of the transfer process, a real-time position reporting instruction is triggered after the touching and sliding event, and a top left corner is set to be a coordinate origin (0, 0). A reporting instruction (including, but not limited to, initial position and real-time position reporting instructions) is encapsulated in an XML format, and is transmitted to the apparatus for displayed content transfer between screens through a TCP protocol.

A format of the initial position reporting instruction is as follows:

<InitPos commandToken="98766" clientId="1" targetId="2" initPosX="200" initPosY="300" /> where initPosX and initPosY represent coordinate values of coordinates P(x, y) of the initial position.

A format of the real-time position reporting instruction is as follows:

<CurrPos commandToken="98767" clientId="1" targetId="2" currPosX="240" currPosY="300" mainCuter="0"/> where mainCuter represents a flag bit of primary screen redrawing, "0" represents performing primary screen redrawing, and "1" represents not performing primary screen redrawing.

In step S102, determine, according to the initial position and the real-time position of the sliding, a display area of a screen of the secondary screen display device after the sliding by using the sliding direction as a reference direction.

In this embodiment, another display device that is preselected is the transfer destination display device, and a screen of the transfer destination display device is the secondary screen.

Specifically, display area coordinates of the primary screen and the secondary screen after the sliding are determined by using the sliding direction as the reference direction and according to the initial position and the real-time position of the sliding, and display areas of the primary screen and the secondary screen are determined according to the display area coordinates of the primary screen and the secondary screen.

Figure 3:
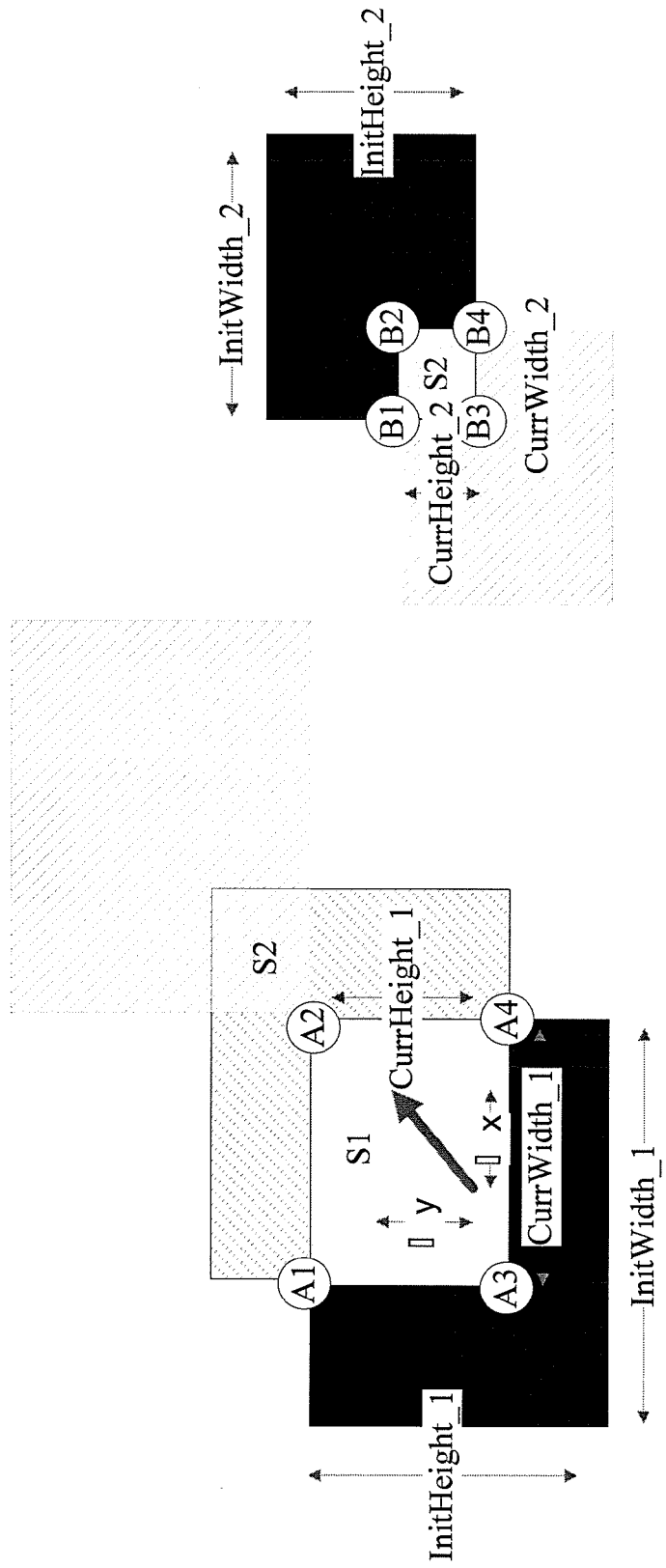
FIG. 3 is an exemplary diagram for calculating display area coordinates according to Embodiment 1 of the present invention.

An exemplary calculation formula used for determining the display area coordinates of the secondary screen after the sliding according to the initial position and the real-time position of the sliding (as shown in FIG. 3, the sliding direction is the 2 o'clock direction, InitWidth_2 represents a width of an initial display frame of the secondary screen, InitHeight_2 represents a height of the initial display frame of the secondary screen, CurrWidth_2 represents a width of a real-time display frame of the secondary screen, and CurrHeight_2 represents a height of the real-time display frame of the secondary screen) is:

$$B1(x, y) = B1\left(0, \text{InitHeight\_2} - \Delta y \times k \times \frac{\text{InitHeight\_2}}{\text{InitHeight\_1}}\right)$$

$$B2(x, y) = B2\left(\Delta x \times k \times \frac{\text{InitWidth\_2}}{\text{InitWidth\_1}}, \text{InitHeight\_2} - \Delta y \times k \times \frac{\text{InitHeight\_2}}{\text{InitHeight\_1}}\right)$$

$$B3(x, y) = B3(0, \text{InitHeight\_2})$$

$$B4(x, y) = B4\left(\Delta x \times k \times \frac{\text{InitWidth\_2}}{\text{InitWidth\_1}}, \text{InitHeight\_2}\right)$$

where $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, InitHeight_1 represents a height of the initial display frame of the primary screen, InitWidth_2 represents a width of an initial display frame of a secondary screen, InitHeight_2 represents a height of the initial display frame of the secondary screen, and k represents a ratio between sliding displacement on the primary screen and a moving distance of displayed content on the primary screen. A rectangular area formed by connecting B1(x, y) B2(x, y), B3(x, y) and B4(x, y) is the display area.

An exemplary calculation formula used for determining the display area coordinates of the primary screen after the sliding according to the initial position and the real-time position of the sliding (as shown in FIG. 3, the sliding direction is the 2 o'clock direction, InitWidth_1 represents a width of an initial display frame of the primary screen, InitHeight_1 represents a height of the initial display frame of the primary screen, CurrWidth_1 represents a width of a real-time display frame of the primary screen, and CurrHeight_1 represents a height of the real-time display frame of the primary screen) is:

$$A1(x,y)=A1(\Delta x \times k, 0)$$

$$A2(x,y)=A2(\text{InitWidth\_1}, 0)$$

$$A3(x,y)=A3(\Delta x \times k, \Delta y \times k)$$

$$A4(x,y)=A4(\text{InitWidth\_1}, \Delta y \times k)$$

where $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, and k represents a ratio between sliding displacement on the primary screen and a moving distance of displayed content on the primary screen. A specific value of k is determined according to a size of the primary screen, as shown in Table 3 (but the specific value is not limited to that shown in Table 3, adjustment may be made according to an actual situation in a specific application).

TABLE 3

| Screen Size | Value of k | Sliding Displacement | Moving Distance of Displayed Content |
|---|---|---|---|
| 4.3 inches (smartphone) | 1 | 2 cm | 2 cm |
| 9.7 inches (iPAD) | 1.8 | 5 cm | 9 cm |

It should be noted that, the calculation formulas of the display area coordinates of the primary screen and the secondary screen use a plane where the primary screen is located as a plane of a rectangular coordinate system, which is applicable to all sliding directions in positive directions of x and y in a first quadrant.

In step S103, tailor currently displayed content of the primary screen display device according to the display area, to obtain tailored content.

In this embodiment, the tailored content is displayed in a corresponding display area, that is, content tailored according to the display area of the primary screen is displayed in the display area of the primary screen, and content tailored according to the display area of the secondary screen is displayed in the display area of the secondary screen.

In this embodiment, the tailoring of the displayed content determines an image actually displayed on the primary screen and the secondary screen in the transfer process. The tailoring of the displayed content is actually a method for intercepting a data source, where the data source may be understood as a matrix model. A specific intercepting process is described in the following through an example.

By taking the 2 o'clock sliding direction in FIG. 3 as an example, a matrix of 6×8 is taken from a primary screen data source, and a matrix of 4×5 is taken from a secondary screen data source (in an actual application, the matrix model is established according to the resolution of the screen, such as 1024×768 and 800×480).

$$M1[x,y] = \begin{bmatrix} a_{11} & a_{12} & a_{13} & a_{14} & a_{15} & a_{16} & a_{17} & a_{18} \\ a_{21} & a_{22} & a_{23} & a_{24} & a_{25} & a_{26} & a_{27} & a_{28} \\ a_{31} & a_{32} & a_{33} & a_{34} & a_{35} & a_{36} & a_{37} & a_{38} \\ a_{41} & a_{42} & a_{43} & a_{44} & a_{45} & a_{46} & a_{47} & a_{48} \\ a_{51} & a_{52} & a_{53} & a_{54} & a_{55} & a_{56} & a_{57} & a_{58} \\ a_{61} & a_{62} & a_{63} & a_{64} & a_{65} & a_{66} & a_{67} & a_{68} \end{bmatrix}$$

$$M2[x,y] = \begin{bmatrix} a_{11} & a_{12} & a_{13} & a_{14} & a_{15} \\ a_{21} & a_{22} & a_{23} & a_{24} & a_{25} \\ a_{31} & a_{32} & a_{33} & a_{34} & a_{35} \\ a_{41} & a_{42} & a_{43} & a_{44} & a_{45} \end{bmatrix}$$

where M1 represents a display matrix of the primary screen, and content in the dotted box is the tailored content; M2 represents a display matrix of the secondary screen, and content in the dotted box is the tailored content.

M1 and M2 specifically are:

$$M1[x,y] = \begin{pmatrix} a_{\left(\left(\left(\text{InitHeight\_1} - \Delta y \times k\right) \times \frac{y\text{Res\_1}}{\text{InitHeight\_1}}\right), 1\right)} & \cdots & a_{\left(\left(\text{InitHeight\_1} - \Delta y \times k\right) \times \frac{y\text{Res\_1}}{\text{InitHeight\_1}}, \left(\text{InitWidth\_1} - \Delta x \times k\right) \times \frac{x\text{Res\_1}}{\text{InitWidth\_1}}\right)} \\ \vdots & \ddots & \vdots \\ a_{(y\text{Res\_1}, 1)} & \cdots & a_{\left(y\text{Res\_1}, \left(\text{InitWidth\_1} - \Delta x \times k\right) \times \frac{x\text{Res\_1}}{\text{InitWidth\_1}}\right)} \end{pmatrix}$$

$$M2[x,y] = \begin{pmatrix} a_{\left(1, \Delta x \times k \times \frac{\text{InitWidth\_2}}{\text{InitWidth\_1}} \times \frac{x\text{Res\_2}}{\text{InitWidth\_2}}\right)} & \cdots & a_{(1, x\text{Res\_2})} \\ \vdots & \ddots & \vdots \\ a_{\left(\Delta y \times k \times \frac{\text{InitHeight\_2}}{\text{InitHeight\_1}} \times \frac{y\text{Res\_2}}{\text{InitHeight\_2}}, \Delta x \times k \times \frac{\text{InitWidth\_2}}{\text{InitWidth\_1}} \times \frac{x\text{Res\_2}}{\text{InitWidth\_2}}\right)} & \cdots & a_{\left(\Delta y \times k \times \frac{\text{InitHeight\_2}}{\text{InitHeight\_1}} \times \frac{y\text{Res\_2}}{\text{InitHeight\_2}}, x\text{Res\_2}\right)} \end{pmatrix}$$

where xRes_1 and yRes_1 represent a width and a height of the resolution of the primary screen, and xRes_2 and yRes_2 represent a width and a height of the resolution of the secondary screen.

Persons of ordinary skill in the art should know that the foregoing example is merely used to describe a tailoring process of the displayed content of the primary screen and the secondary screen, and is not used to limit the protection scope of the present invention.

It should be noted that, when the display attributes of the primary screen and the secondary screen are inconsistent, the currently displayed content of the primary screen needs to be converted and then tailored.

In step S104, send the tailored content and information of the display area to the secondary screen display device, so that the secondary screen display device displays the tailored content on the display area.

In the embodiment of the present invention, in the process of displayed content transfer between screens, displayed content on a transfer initiating end is displayed on a transfer destination end in a progressive manner (that is, a manner in which content displayed on the secondary screen increases gradually), so that the displayed content on the display screen of the transfer destination end increases gradually, and the displayed content of the transfer initiating end decreases gradually, thereby fully embodying a dynamic transfer process and improving experience feeling of the user. During the transfer, transfer in any direction may be implemented, thereby having stronger utility.

Preferably, in this embodiment, in the process of displaying the displayed content of the primary screen on the secondary screen, whether primary screen redrawing needs to be performed may be selected. If yes, the display area coordinates of the primary screen after the sliding is determined by using the sliding direction as the reference direction and according to the initial position and the real-time position of the sliding. The display area of the primary screen is determined according to the display area coordinates of the primary screen, the currently displayed content of the primary screen is tailored according to the display area, and the tailored content is displayed on the display area of the display screen. Through primary screen redrawing, the dynamic transfer process may be further embodied and the experience feeling of the user may be improved, so that when the displayed content of the secondary screen increases gradually, the displayed content of the primary screen decreases gradually. When the sliding direction is the horizontal direction or the vertical direction, at any time, a sum of the displayed content of the primary screen and the displayed content of the secondary screen is content displayed on a complete screen. If the primary screen redrawing is not required, the primary screen maintains initialized display. It should be noted that, in this embodiment, a default selection state is: not performing primary screen redrawing.

Embodiment 2

Figure 4:
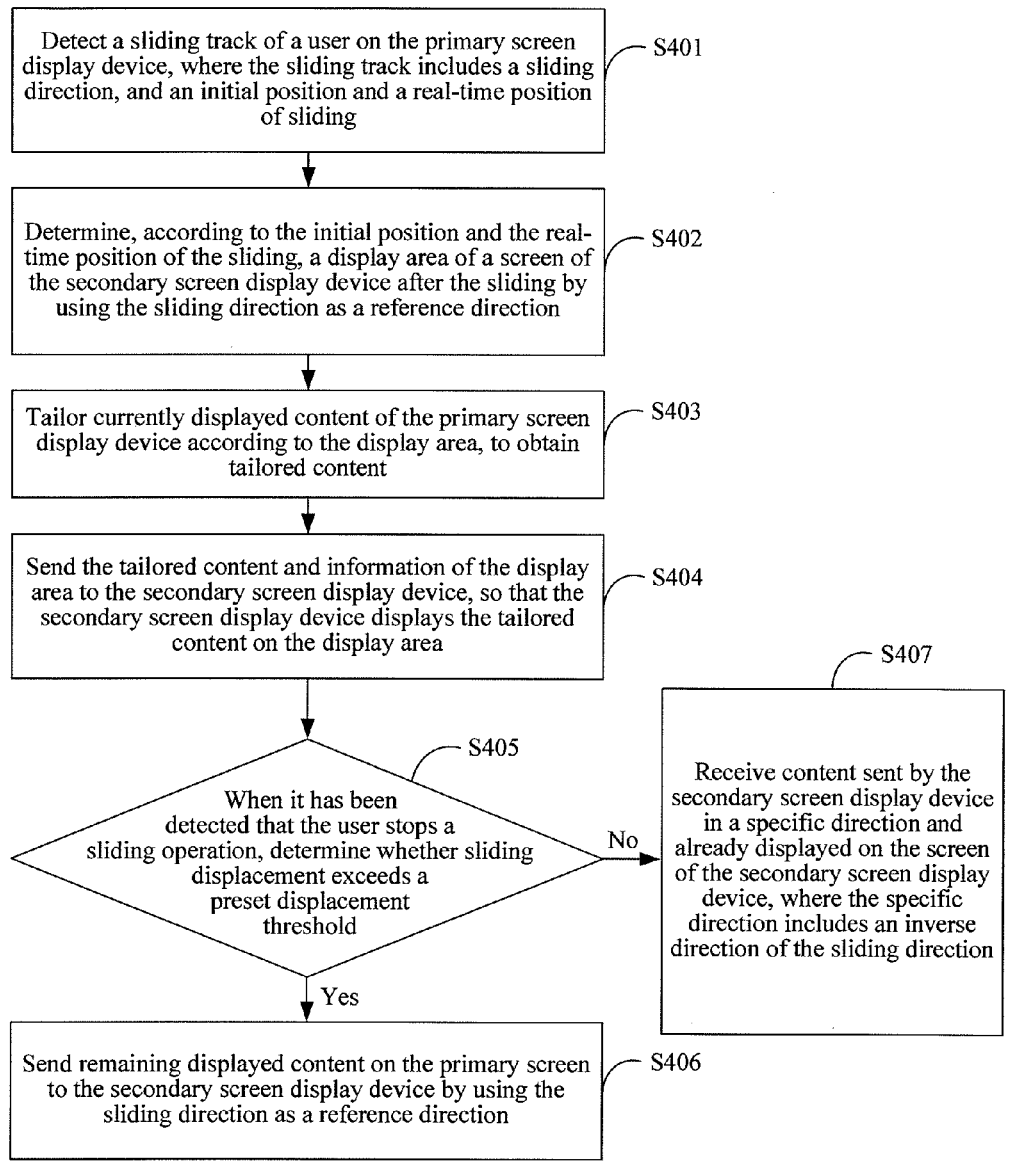
FIG. 4 is an implementation flow chart of a method for displayed content transfer between screens according to Embodiment 2 of the present invention.

FIG. 4 shows an implementation flow of a method for displayed content transfer between screens according to Embodiment 2 of the present invention. The following steps are added in Embodiment 2 on the basis of Embodiment 1.

In step S405, when it has been detected that the user stops a sliding operation, calculate sliding displacement according to the initial position and a real-time position of the sliding to determine whether the sliding displacement exceeds a preset displacement threshold. If a determining result is "yes", perform step S406; otherwise, perform step S407.

In this embodiment, that the user stops the sliding operation includes: a finger of the user leaves the screen of the display device or stay time of a finger of the user in a certain position of the screen exceeds a preset time threshold.

In this embodiment, an exemplary formula for calculating the sliding displacement according to the initial position and the real-time position of the sliding to determine whether the sliding displacement exceeds the preset displacement threshold is:

$$|\Delta x \times k| > \text{InitWidth\_1} \times 0.5$$

or, $$|\Delta y \times k| > \text{InitHeight\_1} \times 0.5$$

where $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, InitHeight_1 represents a height of the initial display frame of the primary screen, and k represents a ratio between sliding displacement on the primary screen and a moving distance of displayed content on the primary screen; and InitHeight_1×0.5 and InitWidth_1×0.5 and are preset displacement thresholds, and may be adjusted according to an actual situation in a specific application.

In step S406, send remaining displayed content on the primary screen to the secondary screen display device by using the sliding direction as a reference direction.

In this embodiment, after the transfer destination display device completes the data source initialization, and when the sliding displacement exceeds the preset displacement threshold, whole content in a secondary screen display matrix is sent to the secondary screen display device, for example, whole content in the matrix M2.

In step S407, receive content sent by the secondary screen display device in a specific direction and already displayed on the screen of the secondary screen display device, where the specific direction includes an inverse direction of the sliding direction.

In this embodiment, the primary screen returns to an initial display state, and no display content is output on the secondary screen. When the sliding displacement does not exceed the preset displacement threshold, the content already displayed on the secondary screen is returned to the primary screen in the inverse direction of the sliding direction, and the displayed content of the secondary screen decreases gradually until the whole display area of the secondary screen is blank.

Through this embodiment, the transfer process may be controlled more efficiently, and utility of an apparatus for displayed content transfer between screens and user satisfaction are improved.

For the convenience of initiating, by the transfer initiating display device, a second transfer operation within a preset time threshold, as an exemplary embodiment of the present invention, the method further includes:

after completely receiving the content sent by the secondary screen display device in the specific direction and already displayed on the screen of the secondary screen display device, keeping a traversable state of the primary screen and the secondary screen within the preset time threshold, where the traversable state includes a connection communication state of the primary screen and the secondary screen.

Figure 5A:
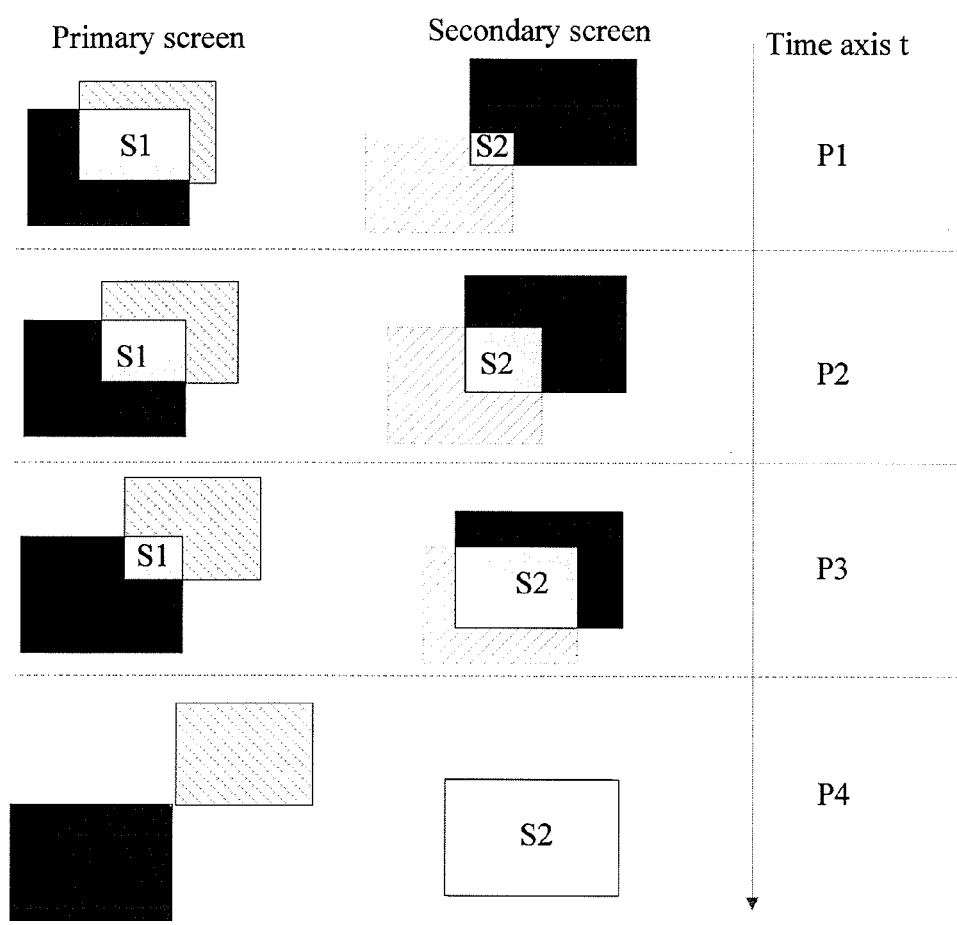

The transfer process of this embodiment is further described through FIG. 5a and FIG. 5b.

For FIG. 5a, in a P1 stage, a sliding track of a user on the screen of the display device is detected, and display area coordinates of the primary screen and the secondary screen after the sliding are determined by using the sliding direction in the sliding track as the reference direction and according to the initial position and the real-time position of the sliding in the sliding track.

In a P2 stage, after it has been detected that the user stops the sliding operation, the sliding displacement is calculated according to the initial position and the real-time position of the sliding, where the sliding displacement obtained through calculation exceeds the preset displacement threshold.

In a P3 stage, the transfer operation is performed automatically, and remaining displayed content on the primary screen is displayed on the secondary screen by continuously using the sliding direction as the reference direction.

In a P4 stage, the display area of the primary screen is blank, and the display area of the secondary screen is full. The transfer process ends.

For FIG. 5b, in a P1 stage, a sliding track of a user on the screen of the display device is detected, and display area coordinates of the primary screen and the secondary screen after the sliding are determined by using the sliding direction in the sliding track as the reference direction and according to the initial position and the real-time position of the sliding in the sliding track.

In a P2 stage, after it has been detected that the user stops the sliding operation, the sliding displacement is calculated according to the initial position and the real-time position of the sliding, where the sliding displacement obtained through calculation does not exceed the preset displacement threshold.

In a P3 stage, the content already displayed on the secondary screen is automatically returned to the primary screen in the inverse direction of the sliding direction.

In a P4 stage, the primary screen returns to the initial display state, and no display content is output on the secondary screen. The transfer process ends. However, the traversable state of the primary screen and the secondary screen is still kept within the preset time threshold, so that the primary screen can initiate the second transfer within the preset time threshold.

Embodiment 3

FIG. 6 shows an implementation flow of a method for displayed content transfer between screens according to Embodiment 3 of the present invention, which is applied to a secondary screen display device, where the secondary screen display device is connected to a primary screen display device, and a process of the method is described in detail in the following.

In step S601, receive tailored content and a display area which are sent by the primary screen display device.

In this embodiment, the display area is determined by the primary screen display device according to a sliding track of a user on the primary screen display device, and the tailored content is content obtained after the primary screen display device tailors currently displayed content of the primary screen display device according to the display area.

In step S602, display the tailored content on the display area.

In this embodiment, the display area of the secondary screen is determined according to a real-time sliding track of the user on the primary screen display device, which may fully embody a process of dynamic transfer of displayed content between screens and improve experience feeling of the user.

Embodiment 4

Figure 7:
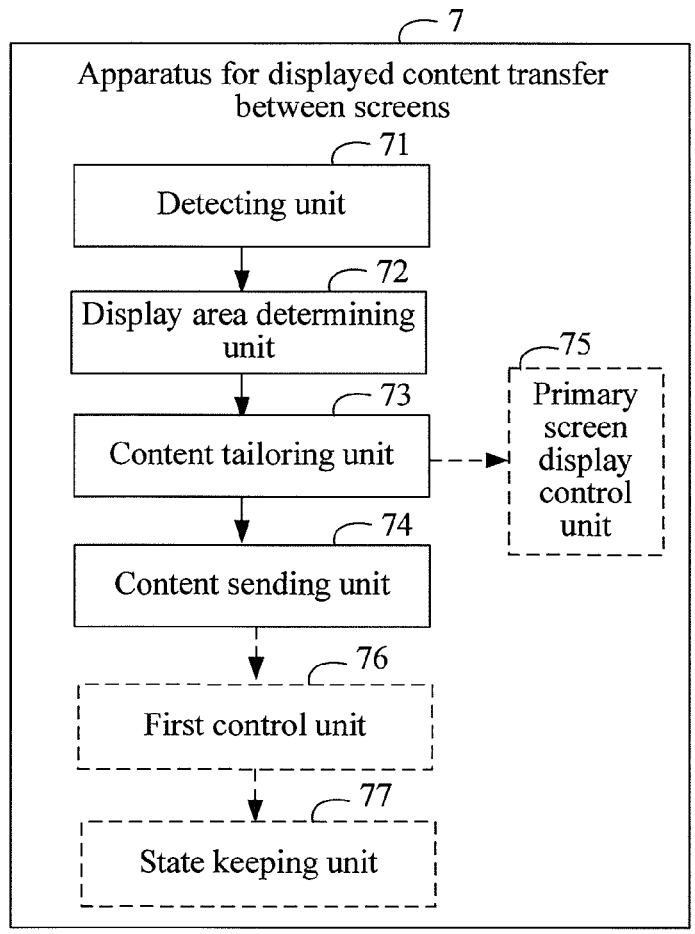
FIG. 7 is a composition structural diagram of an apparatus for displayed content transfer between screens according to Embodiment 4 of the present invention.

FIG. 7 shows a composition structure of an apparatus for displayed content transfer between screens according to Embodiment 4 of the present invention. For the convenience of description, only a part related to the embodiment of the present invention is shown.

The apparatus for displayed content transfer between screens may be a software unit, a hardware unit or a unit combining software and hardware running in a primary screen display device, and may also be an independent plug-in which is integrated into the primary screen display device or runs in an application system of the primary screen display device.

The apparatus 7 for displayed content transfer between screens includes a detecting unit 71, a display area determining unit 72, a content tailoring unit 73 and a content sending unit 74, and specific functions of the units are as follows.

The detecting unit 71 is configured to detect a sliding track of a user on the primary screen display device, where the sliding track includes a sliding direction, and an initial position and a real-time position of sliding.

The display area determining unit 72 is configured to determine, according to the initial position and the real-time position of the sliding, a display area of a screen of a secondary screen display device after the sliding by using the sliding direction as a reference direction.

The content tailoring unit 73 is configured to tailor currently displayed content of the primary screen display device according to the display area, to obtain tailored content.

The content sending unit 74 is configured to send the tailored content and the display area to the secondary screen display device, so that the secondary screen display device displays the tailored content on the display area.

Further, the apparatus further includes a primary screen display control unit 75.

The primary screen display control unit 75 is configured to determine, according to the initial position and the real-time position of the sliding, a display area of a screen of the primary screen display device after the sliding by using the sliding direction as a reference direction; tailor the currently displayed content of the primary screen display device according to the display area of the screen of the primary screen display device; and display the tailored content on the display area of the screen of the primary screen display device.

The determining, according to the initial position and the real-time position of the sliding, the display area of the screen of the secondary screen display device after the sliding by using the sliding direction as the reference direction includes: calculating the following formulas:

$$B1(x, y) = B1\left(0, \text{InitHeight\_2} - \Delta y \times k \times \frac{\text{InitHeight\_2}}{\text{InitHeight\_1}}\right)$$

$$B2(x, y) = B2\left(\Delta x \times k \times \frac{\text{InitWidth\_2}}{\text{InitWidth\_1}}, \text{InitHeight\_2} - \Delta y \times k \times \frac{\text{InitHeight\_2}}{\text{InitHeight\_1}}\right)$$

$$B3(x, y) = B3(0, \text{InitHeight\_2})$$

$$B4(x, y) = B4\left(\Delta x \times k \times \frac{\text{InitWidth\_2}}{\text{InitWidth\_1}}, \text{InitHeight\_2}\right)$$

where the sliding direction is the 2 o'clock direction, $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, InitHeight_1 represents a height of the initial display frame of the primary screen, InitWidth_2 represents a width of an initial display frame of a secondary screen, InitHeight_2 represents a height of the initial display frame of the secondary screen, and k represents a ratio between sliding displacement on the primary screen and a moving distance of displayed content on the primary screen.

The determining, according to the initial position and the real-time position of the sliding, the display area of the screen of the primary screen display device after the sliding by using the sliding direction as the reference direction includes: calculating the following formulas:

$$A1(x,y)=A1(\Delta x \times k, 0)$$

$$A2(x,y)=A2(\text{InitWidth\_1}, 0)$$

$$A3(x,y)=A3(\Delta x \times k, \Delta y \times k)$$

$$A4(x,y)=A4(\text{InitWidth\_1}, \Delta y \times k)$$

where the sliding direction is the 2 o'clock direction, $\Delta x=x_2-x_1$, $\Delta y=y_2-y_1$, $(x_1, y_1)$ represents an initial position of the sliding, $(x_2, y_2)$ represents a real-time position of the sliding, InitWidth_1 represents a width of an initial display frame of a primary screen, and k represents a ratio between sliding displacement on the primary screen and a moving distance of displayed content on the primary screen.

Preferably, when the sliding direction is a horizontal direction or a vertical direction, at any time, a sum of the displayed content of the primary screen and the displayed content of the secondary screen is content displayed on a complete screen.

Further, in order to control a transfer process more efficiently and improve utility of the apparatus and user satisfaction, the apparatus 7 further includes a first control unit 76.

The first control unit 76 is configured to: when it has been detected that the user stops a sliding operation, calculate sliding displacement according to the initial position and the real-time position of the sliding to determine whether the sliding displacement exceeds a preset displacement threshold; if yes, send remaining displayed content on the primary screen to the secondary screen display device by using the sliding direction as a reference direction; and if no, receive content sent by the secondary screen display device in a specific direction and already displayed on the screen of the secondary screen display device, where the specific direction includes an inverse direction of the sliding direction. An exemplary formula for calculating the sliding displacement according to the initial position and the real-time position of the sliding to determine whether the sliding displacement exceeds the preset displacement threshold is:

$$|\Delta x \times k| > \text{InitWidth\_1} \times 0.5$$

or, $$|\Delta y \times k| > \text{InitHeight\_1} \times 0.5$$

where $\Delta x=x_2-x_1$, $\Delta y=y_2-y_1$, $(x_1, y_1)$ represents an initial position of the sliding, $(x_2, y_2)$ represents a real-time position of the sliding, InitWidth_1 represents a width of an initial display frame of a primary screen, InitHeight_1 represents a height of the initial display frame of the primary screen, and k represents a ratio between sliding displacement on the primary screen and a moving distance of displayed content on the primary screen.

Further, for the convenience of initiating, by a transfer initiating display device, a transfer operation again within a preset time threshold, the apparatus 7 further includes:

a state keeping unit 77, configured to: after the content sent by the secondary screen display device in the specific direction and already displayed on the screen of the secondary screen display device is completely received, keep a traversable state of the primary screen and the secondary screen within the preset time threshold, where the traversable state includes a connection communication state of the primary screen and the secondary screen.

The apparatus for displayed content transfer between screens provided by this embodiment may be used in the foregoing corresponding method for displayed content transfer between screens. Reference may be made to the related description of the method for displayed content transfer between screens in Embodiment 1 and Embodiment 2 for details, which are not repeatedly described herein.

Embodiment 5

Figure 8:
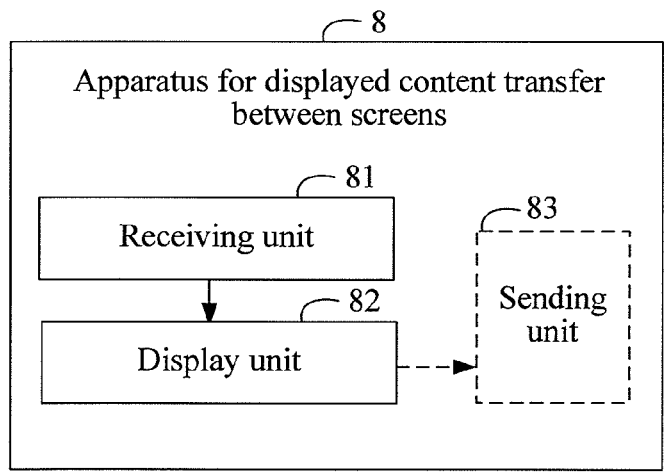
FIG. 8 is a composition structural diagram of an apparatus for displayed content transfer between screens according to Embodiment 5 of the present invention.

FIG. 8 shows a composition structure of an apparatus for displayed content transfer between screens according to Embodiment 5 of the present invention. For the convenience of description, only a part related to the embodiment of the present invention is shown.

The apparatus for displayed content transfer between screens may be a software unit, a hardware unit or a unit combining software and hardware running in a secondary screen display device, and may also be an independent plug-in which is integrated into the secondary screen display device or runs in an application system of the secondary screen display device.

The apparatus 8 for displayed content transfer between screens includes a receiving unit 81 and a display unit 82. Specific functions of the units are as follows.

The receiving unit 81 is configured to receive tailored content and information of a display area which are sent by a primary screen display device, where the display area is determined by the primary screen display device according to a sliding track of a user on the primary screen display device, and the tailored content is content obtained after the primary screen display device tailors currently displayed content of the primary screen display device according to the display area.

The display unit 82 is configured to display the tailored content on the display area.

Further, the apparatus 8 further includes:

a sending unit 83, configured to: when sliding displacement of the user on the primary screen display device is less than a preset displacement threshold, send content already displayed on a screen of the secondary screen display device to the primary screen display device in a specific direction, where the specific direction includes an inverse direction of the sliding direction.

The apparatus for displayed content transfer between screens provided by this embodiment may be used in the foregoing corresponding method for displayed content transfer between screens. Reference may be made to the related description of the method for displayed content transfer between screens in Embodiment 3 for details, which are not repeatedly described herein.

As another embodiment of the present invention, a system for displayed content transfer between screens is further provided, where the system includes an apparatus for displayed content transfer between screens which is applied to a primary screen display device and/or a secondary screen display device. The system for displayed content transfer between screens may be a software unit, a hardware unit or a unit combining software and hardware running in a display device.

Persons of ordinary skill in the art may understand that the units included in the apparatuses in Embodiment 4 and Embodiment 5 are divided according to functional logic, but the present invention is not limited to the foregoing division as long as the corresponding functions can be implemented. In addition, a specific name of each functional unit is merely used for the convenience of differentiation from each other, but is not used to limit the protection scope of the present invention.

In conclusion, in the embodiments of the present invention, displayed content on a transfer initiating end is displayed on a transfer destination end in a progressive manner, so that displayed content on a display screen of the transfer destination end increases gradually, and displayed content of the transfer initiating end decreases gradually, thereby fully embodying a dynamic transfer process and improving experience feeling of the user. During the transfer, transfer in any direction may be implemented, thereby having stronger utility. In addition, when it has been detected that the user stops the sliding operation, completion and returning of the transfer process are further controlled by determining whether the sliding displacement exceeds the preset displacement threshold, thereby improving user satisfaction. For the convenience of initiating, by the transfer initiating display device, the transfer operation again within the preset time threshold, after the content already displayed on the secondary screen is returned to the primary screen, the traversable state of the primary screen and the secondary screen is kept within the preset time threshold.

Persons of ordinary skill in the art may understand that all or a part of the steps of the method according to the embodiments may be implemented by a program instructing relevant hardware. The program may be stored in a computer readable storage medium, and the storage medium includes a ROM/RAM, a magnetic disk, an optical disk, or the like.

What is claimed is:

1. A method for displayed content transfer between screens, applied to a primary screen display device, wherein the primary screen display device is connected to a secondary screen display device, the method comprising:

detecting a sliding track of a user on the primary screen display device, wherein the sliding track comprises a sliding direction, an initial position and a real-time position of sliding;

determining, according to the initial position and the real-time position of the sliding, a display area of a screen of the secondary screen display device after the sliding by using the sliding direction as a reference direction;

tailoring currently displayed content of the primary screen display device according to the display area, to obtain tailored content; and sending the tailored content and the display area to the secondary screen display device, so that the secondary screen display device displays the tailored content on the display area;

wherein determining, according to the initial position and the real-time position of the sliding, the display area of the screen of the secondary screen display device after the sliding by using the sliding direction as the reference direction comprises:

calculating the following formulas:

$$B1(x, y) = B1\left(0, \text{InitHeight\_2} - \Delta y \times k \times \frac{\text{InitHeight\_2}}{\text{InitHeight\_1}}\right)$$

$$B2(x, y) = B2\left(\Delta x \times k \times \frac{\text{InitWidth\_2}}{\text{InitWidth\_1}}, \text{InitHeight\_2} - \Delta y \times k \times \frac{\text{InitHeight\_2}}{\text{InitHeight\_1}}\right)$$

-continued $$B3(x, y) = B3(0, \text{InitHeight\_2})$$

$$B4(x, y) = B4\left(\Delta x \times k \times \frac{\text{InitWidth\_2}}{\text{InitWidth\_1}}, \text{InitHeight\_2}\right)$$

wherein the sliding direction is the 2 o'clock direction, $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, InitHeight_1 represents a height of the initial display frame of the primary screen, InitWidth_2 represents a width of an initial display frame of a secondary screen, InitHeight_2 represents a height of the initial display frame of the secondary screen, and k represents a ratio between sliding displacement on the primary screen and a moving distance of displayed content on the primary screen.

2. A method for displayed content transfer between screens, applied to a primary screen display device, wherein the primary screen display device is connected to a secondary screen display device, the method comprising:

detecting a sliding track of a user on the primary screen display device, wherein the sliding track comprises a sliding direction, an initial position and a real-time position of sliding;

determining, according to the initial position and the real-time position of the sliding, a display area of a screen of the secondary screen display device after the sliding by using the sliding direction as a reference direction;

tailoring currently displayed content of the primary screen display device according to the display area of the secondary screen display device, to obtain tailored content;

sending the tailored content and the display area to the secondary screen display device, so that the secondary screen display device displays the tailored content on the display area;

determining, according to the initial position and the real-time position of the sliding, a display area of a screen of the primary screen display device after the sliding by using the sliding direction as a reference direction;

tailoring the currently displayed content of the primary screen display device according to the display area of the screen of the primary screen display device; and displaying the tailored content on the display area of the screen of the primary screen display device;

wherein determining, according to the initial position and the real-time position of the sliding, the display area of the screen of the primary screen display device after the sliding by using the sliding direction as the reference direction comprises:

calculating the following formulas:

$$A1(x,y)=A1(\Delta x \times k, 0)$$

$$A2(x,y)=A2(\text{InitWidth\_1}, 0)$$

$$A3(x,y)=A3(\Delta x \times k, \Delta y \times k)$$

$$A4(x,y)=A4(\text{InitWidth\_1}, \Delta y \times k)$$

wherein the sliding direction is the 2 o'clock direction, $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, and k represents a ratio between sliding displacement on the primary screen and a moving distance of displayed content on the primary screen.

3. A method for displayed content transfer between screens, applied to a primary screen display device, wherein the primary screen display device is connected to a secondary screen display device, the method comprising:
   detecting a sliding track of a user on the primary screen display device, wherein the sliding track comprises a sliding direction, an initial position and a real-time position of sliding;
   determining, according to the initial position and the real-time position of the sliding, a display area of a screen of the secondary screen display device after the sliding by using the sliding direction as a reference direction;
   tailoring currently displayed content of the primary screen display device according to the display area, to obtain tailored content; and
   sending the tailored content and the display area to the secondary screen display device, so that the secondary screen display device displays the tailored content on the display area;
   wherein the method further comprises:
   after detecting that the user stops a sliding operation, calculating sliding displacement according to the initial position and the real-time position of the sliding, to determine whether the sliding displacement exceeds a preset displacement threshold;
   in response to the sliding exceeding the preset displacement threshold, sending remaining displayed content on the primary screen to the secondary screen display device by using the sliding direction as a reference direction; or
   in response to the sliding not exceeding the preset displacement threshold, receiving content sent by the secondary screen display device in a specific direction and already displayed on the screen of the secondary screen display device, wherein the specific direction comprises an inverse direction of the sliding direction;
   wherein a formula for calculating the sliding displacement according to the initial position and the real-time position of the sliding to determine whether the sliding displacement exceeds the preset displacement threshold comprises:

$|\Delta x \times k| > \text{InitWidth\_1} \times 0.5$ or, $|\Delta y \times k| > \text{InitHeight\_1} \times 0.5$ wherein $\Delta x = x_2 - x_1$, $\Delta y = y_2 - y_1$, $(x_1, y_1)$ represents an initial position of the sliding, $(x_2, y_2)$ represents a real-time position of the sliding InitWidth_1 represents a width of an initial display frame of a primary screen, InitHeight_1 represents a height of the initial display frame of the primary screen, and k represents a ratio between sliding displacement on the primary screen and a moving distance of displayed content on the primary screen.

4. The method according to claim 3, wherein the method further comprises:
   after completely receiving the content sent by the secondary screen display device in the specific direction and already displayed on the screen of the secondary screen display device, keeping a traversable state of the primary screen and the secondary screen within a preset time threshold, wherein the traversable state comprises a connection communication state of the primary screen and the secondary screen.

5. An apparatus for displayed content transfer between screens, applied to a primary screen display device, wherein the primary screen display device is connected to a secondary screen display device, the apparatus comprising:
   a detecting unit, configured to detect a sliding track of a user on the primary screen display device, wherein the sliding track comprises a sliding direction, and an initial position and a real-time position of sliding;
   a display area determining unit, configured to determine, according to the initial position and the real-time position of the sliding, a display area of a screen of the secondary screen display device after the sliding by using the sliding direction as a reference direction;
   a content tailoring unit, configured to tailor currently displayed content of the primary screen display device according to the display area, to obtain tailored content; and
   a content sending unit, configured to send the tailored content and the display area to the secondary screen display device, so that the secondary screen display device displays the tailored content on the display area;
   wherein the display area determining unit is further configured to calculate the following formulas:

$$B1(x, y) = B1\left(0, \text{InitHeight\_2} - \Delta y \times k \times \frac{\text{InitHeight\_2}}{\text{InitHeight\_1}}\right)$$

$$B2(x, y) = B2\left(\Delta x \times k \times \frac{\text{InitWidth\_2}}{\text{InitWidth\_1}}, \text{InitHeight\_2} - \Delta y \times k \times \frac{\text{InitHeight\_2}}{\text{InitHeight\_1}}\right)$$

$$B3(x, y) = B3(0, \text{InitHeight\_2})$$

$$B4(x, y) = B4\left(\Delta x \times k \times \frac{\text{InitWidth\_2}}{\text{InitWidth\_1}}, \text{InitHeight\_2}\right)$$

wherein the sliding direction is the 2 o'clock direction, $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, InitHeight_1 represents a height of the initial display frame of the primary screen, InitWidth_2 represents a width of an initial display frame of a secondary screen, InitHeight_2 represents a height of the initial display frame of the secondary screen, and k represents a ratio between sliding displacement on the primary screen and a moving distance of displayed content on the primary screen.

6. An apparatus for displayed content transfer between screens, applied to a primary screen display device, wherein the primary screen display device is connected to a secondary screen display device, the apparatus comprising:
   a detecting unit, configured to detect a sliding track of a user on the primary screen display device, wherein the sliding track comprises a sliding direction, and an initial position and a real-time position of sliding;
   a display area determining unit, configured to determine, according to the initial position and the real-time position of the sliding, a display area of a screen of the secondary screen display device after the sliding by using the sliding direction as a reference direction;

a content tailoring unit, configured to tailor currently displayed content of the primary screen display device according to the display area of the screen of the secondary screen display device, to obtain tailored content;

a content sending unit, configured to send the tailored content and the display area to the secondary screen display device, so that the secondary screen display device displays the tailored content on the display area; and a primary screen display control unit, configured to:
  determine, according to the initial position and the real-time position of the sliding, a display area of a screen of the primary screen display device after the sliding by using the sliding direction as a reference direction;
  tailor the currently displayed content of the primary screen display device according to the display area of the screen of the primary screen display device; and
  display the tailored content on the display area of the screen of the primary screen display device;
wherein the primary screen display control unit is further configured to calculate the following formulas:

$$A1(x,y)=A1(\Delta x \times k, 0)$$

$$A2(x,y)=A2(\text{InitWidth\_1}, 0)$$

$$A3(x,y)=A3(\Delta x \times k, \Delta y \times k)$$

$$A4(x,y)=A4(\text{InitWidth\_1}, \Delta y \times k)$$

wherein the sliding direction is the 2 o'clock direction, $\Delta x = x_2 - x_1$, $\Delta y = y_2 - y_1$, $(x_1, y_1)$ represents an initial position of the sliding, $(x_2, y_2)$ represents a real-time position of the sliding, InitWidth_1 represents a width of an initial display frame of a primary screen, and k represents a ratio between sliding displacement on the primary screen and a moving distance of displayed content on the primary screen.

7. An apparatus for displayed content transfer between screens, applied to a primary screen display device, wherein the primary screen display device is connected to a secondary screen display device, the apparatus comprising:

a detecting unit, configured to detect a sliding track of a user on the primary screen display device, wherein the sliding track comprises a sliding direction, and an initial position and a real-time position of sliding;

a display area determining unit, configured to determine, according to the initial position and the real-time position of the sliding, a display area of a screen of the secondary screen display device after the sliding by using the sliding direction as a reference direction;

a content tailoring unit, configured to tailor currently displayed content of the primary screen display device according to the display area, to obtain tailored content; and a content sending unit, configured to send the tailored content and the display area to the secondary screen display device, so that the secondary screen display device displays the tailored content on the display area; and a first control unit, configured to:
  when it has been detected that the user stops a sliding operation, calculate sliding displacement according to the initial position and the real-time position of the sliding to determine whether the sliding displacement exceeds a preset displacement threshold;
  in response to the sliding exceeding the preset displacement threshold, send remaining displayed content on the primary screen to the secondary screen display device by using the sliding direction as a reference direction; or
  in response to the sliding not exceeding the preset displacement threshold, receive content sent by the secondary screen display device in a specific direction and already displayed on the screen of the secondary screen display device, wherein the specific direction comprises an inverse direction of the sliding direction;
wherein a formula to calculate the sliding displacement according to the initial position and the real-time position of the sliding to determine whether the sliding displacement exceeds the preset displacement threshold comprises:

$$|\Delta x \times k| > \text{InitWidth\_1} \times 0.5$$

or, $$|\Delta y \times k| > \text{InitHeight\_1} \times 0.5$$

wherein $\Delta x = x_2 - x_1$, $\Delta y = y_2 - y_1$, $(x_1, y_1)$ represents an initial position of the sliding, $(x_2, y_2)$ represents a real-time position of the sliding InitWidth_1 represents a width of an initial display frame of a primary screen, InitHeight_1 represents a height of the initial display frame of the primary screen, and k represents a ratio between sliding displacement on the primary screen and a moving distance of displayed content on the primary screen.

8. The apparatus according to claim 7, wherein the apparatus further comprises:

a state keeping unit, configured to:
  after the content sent by the secondary screen display device in the specific direction and already displayed on the screen of the secondary screen display device is completely received, keep a traversable state of the primary screen and the secondary screen within a preset time threshold, wherein the traversable state comprises a connection communication state of the primary screen and the secondary screen.

* * * * *